US010979312B2

(12) United States Patent
Chaganti et al.

(10) Patent No.: US 10,979,312 B2
(45) Date of Patent: Apr. 13, 2021

(54) SYSTEM AND METHOD TO ASSIGN, MONITOR, AND VALIDATE SOLUTION INFRASTRUCTURE DEPLOYMENT PREREQUISITES IN A CUSTOMER DATA CENTER

(71) Applicant: Dell Products L.P., Hopkinton, MA (US)

(72) Inventors: Ravikanth Chaganti, Bangalore (IN); Dharmesh M. Patel, Round Rock, TX (US); Rizwan Ali, Cedar Park, TX (US)

(73) Assignee: Dell Products L.P., Hopkinton, MA (US)

( * ) Notice: Subject to any disclaimer, the term of this patent is extended or adjusted under 35 U.S.C. 154(b) by 60 days.

(21) Appl. No.: 16/261,110

(22) Filed: Jan. 29, 2019

(65) Prior Publication Data
US 2020/0244545 A1    Jul. 30, 2020

(51) Int. Cl.
*H04L 12/24*    (2006.01)

(52) U.S. Cl.
CPC ............ *H04L 41/22* (2013.01); *H04L 41/044* (2013.01); *H04L 41/0806* (2013.01); *H04L 41/0883* (2013.01)

(58) Field of Classification Search
CPC ... H04L 41/22; H04L 41/044; H04L 41/0806; H04L 41/0883
USPC ....................................................... 709/222
See application file for complete search history.

(56) References Cited

U.S. PATENT DOCUMENTS

| | | |
|---|---|---|
| 4,780,809 A | 10/1988 | Woffinden et al. |
| 6,098,098 A | 8/2000 | Sandahl et al. |
| 7,636,814 B1 | 12/2009 | Karr et al. |
| 7,987,353 B2 | 7/2011 | Holdaway et al. |
| 8,099,571 B1 | 1/2012 | Driscoll et al. |
| 8,161,255 B2 | 4/2012 | Anglin et al. |
| 8,190,835 B1 | 5/2012 | Yueh |
| 8,364,917 B2 | 1/2013 | Bricker et al. |

(Continued)

OTHER PUBLICATIONS

"Make more time for the work that matters most", retrieved on-line Mar. 4, 2019 at https://asana.com/ (5 pages).

(Continued)

*Primary Examiner* — Meng Vang
(74) *Attorney, Agent, or Firm* — Chamberlain, Hrdlicka, White, Williams & Aughtry

(57) ABSTRACT

A deployment orchestrator for managing deployment of a solution architecture includes persistent storage that stores a deployment plan and a deployment manager that orchestrates display, to a user of a user device of the solution architecture, of a graphical user interface (GUI) based on the deployment plan; obtains a task completion indicator for a task specified by the deployment plan via the graphical user interface; updates, based on the task completion indicator, at least one of a task GUI element of the GUI that is associated with the task and a relationship indicator of the GUI that is associated with the task to obtain an updated GUI; after updating the GUI: performs an automated validation task associated with the task; and makes a determination, based on the automated validation task, that the task is completed; and updates the updated GUI, based on the determination, to obtain a second updated GUI.

20 Claims, 14 Drawing Sheets

(56) References Cited

U.S. PATENT DOCUMENTS

| | | |
|---|---|---|
| 8,386,930 B2 | 2/2013 | Dillenberger et al. |
| 8,583,769 B1 | 11/2013 | Peters et al. |
| 8,788,466 B2 | 7/2014 | Anglin et al. |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1* | 8/2017 | Katano ............... H04N 1/00241 |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,185,624 B2 | 1/2019 | Akutsu et al. |
| 10,241,695 B2 | 3/2019 | Baptist et al. |
| 10,339,455 B1 | 7/2019 | Parush-Tzur et al. |
| 10,409,778 B1 | 9/2019 | Zhao et al. |
| 10,503,413 B1 | 12/2019 | Gal et al. |
| 10,503,611 B1 | 12/2019 | Srivastav et al. |
| 2001/0044879 A1 | 11/2001 | Moulton et al. |
| 2003/0058277 A1 | 3/2003 | Bowman-Amuah |
| 2003/0172145 A1 | 9/2003 | Nguyen |
| 2003/0177205 A1* | 9/2003 | Liang ..................... H04L 41/22 |
| | | 709/220 |
| 2004/0128587 A1 | 7/2004 | Kenchammana-Hosekote et al. |
| 2005/0076049 A1* | 4/2005 | Qubti ................... G06Q 10/06 |
| 2007/0283011 A1 | 12/2007 | Rakowski et al. |
| 2008/0244204 A1 | 10/2008 | Cremelie et al. |
| 2009/0077165 A1* | 3/2009 | Rhodes ................. G06Q 10/06 |
| | | 709/203 |
| 2009/0094250 A1 | 4/2009 | Dhuse et al. |
| 2009/0265360 A1 | 10/2009 | Bachwani et al. |
| 2011/0099351 A1 | 4/2011 | Condict |
| 2011/0246597 A1 | 10/2011 | Swanson et al. |
| 2013/0067459 A1 | 3/2013 | Sannidhanam et al. |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1 | 10/2014 | Kim et al. |
| 2015/0058582 A1 | 2/2015 | Baldwin et al. |
| 2015/0161000 A1 | 6/2015 | Kim et al. |
| 2015/0220400 A1 | 8/2015 | Resch et al. |
| 2015/0355980 A1 | 12/2015 | Volvovski et al. |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 | 4/2017 | Dale et al. |
| 2017/0160983 A1 | 6/2017 | Fiske et al. |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0189109 A1 | 7/2018 | Nagai et al. |
| 2018/0278597 A1 | 9/2018 | Helms et al. |
| 2018/0307560 A1 | 10/2018 | Vishnumolakala et al. |
| 2018/0322558 A1 | 11/2018 | Padmanabh et al. |
| 2019/0104398 A1* | 4/2019 | Owen ..................... H04L 41/22 |
| 2019/0109772 A1 | 4/2019 | Lipstone et al. |
| 2019/0197023 A1 | 6/2019 | Chennamsetty et al. |
| 2019/0379588 A1 | 12/2019 | Rao |
| 2020/0050689 A1 | 2/2020 | Tal et al. |

OTHER PUBLICATIONS

"Project Management Redefined", retrieved on-line Mar. 4, 2019 at https://www.robohead.net/features-2/ (2 pages).

"Features" Project Management Tools, retrieved on-line Mar. 4, 2019 at https://www.proworkflow.com/features-project-management-tools/ (7 pages).

Suzhen Wu et al.;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

* cited by examiner

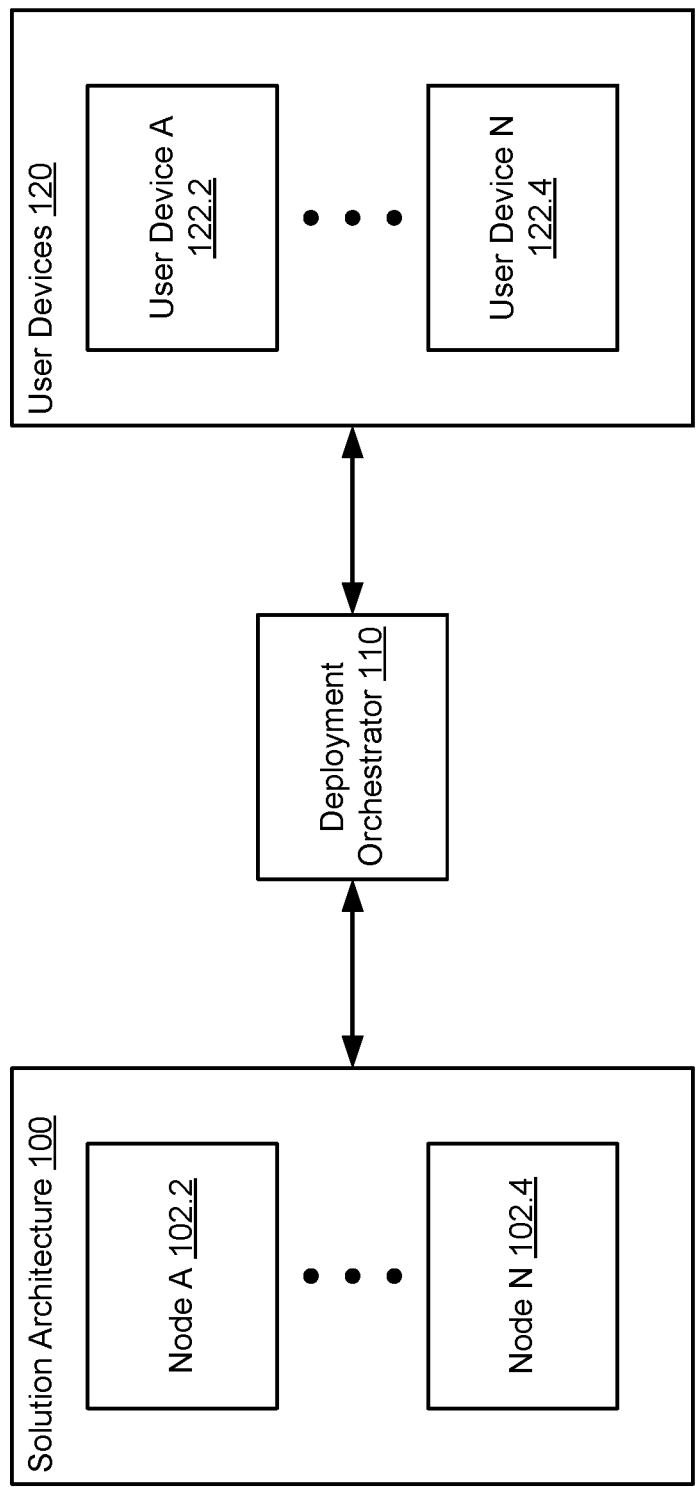
FIG. 1.1

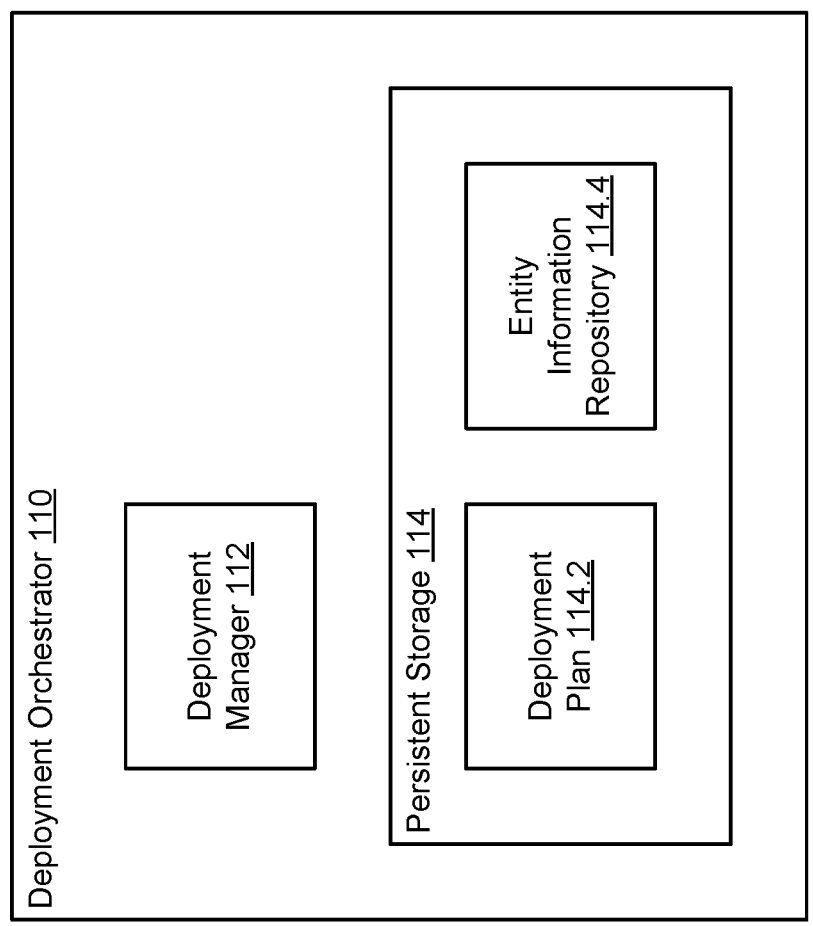

Deployment Plan 114.2

Task A 200

| Assignee Identifier 200.2 | Task Description 200.4 | Automated Validation Task 200.6 | Task Relationships 200.8 |

Task N 202

FIG. 2

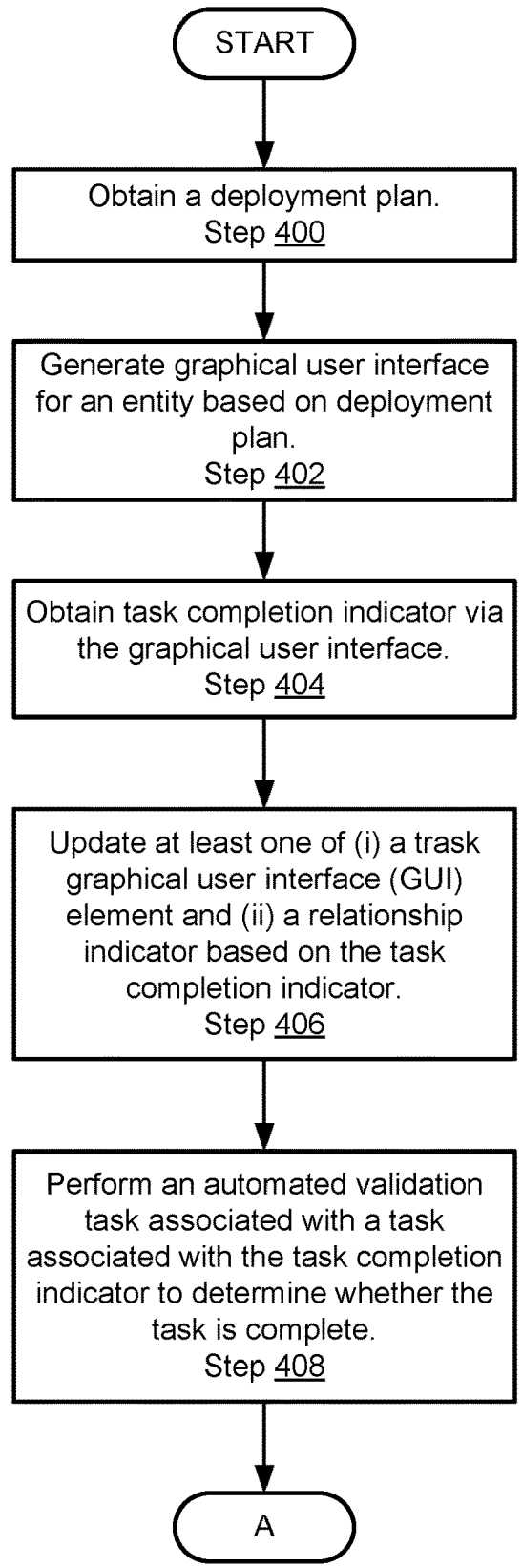
FIG. 4.1

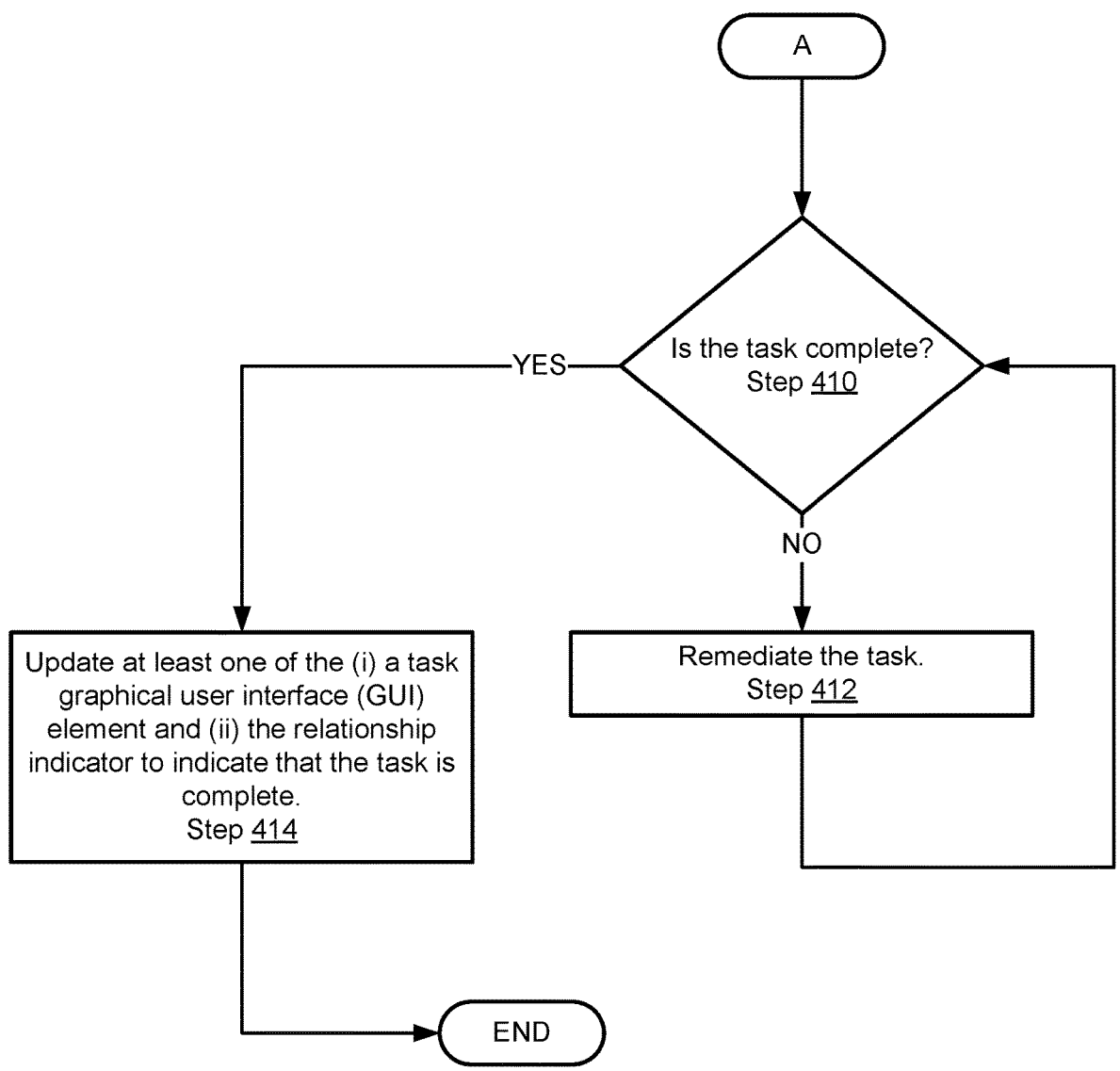
FIG. 4.2

Task 1:
Task: Connect Nodes
Validation: Ping Nodes

Task 2:
Task: Optimize Routing Tables
Validation: Ping Time less than 1 ms?
Dependency: Task 1

Task 3:
Task: Deploy Realtime Networking Stack
Validation: Packet transit time less than 5 ms?
Dependency: Tasks 1 and 2

Task 4:
Task: Deploy Realtime Operating System
Validation: Ping operating system
Dependency: Task3 3

FIG. 5.1

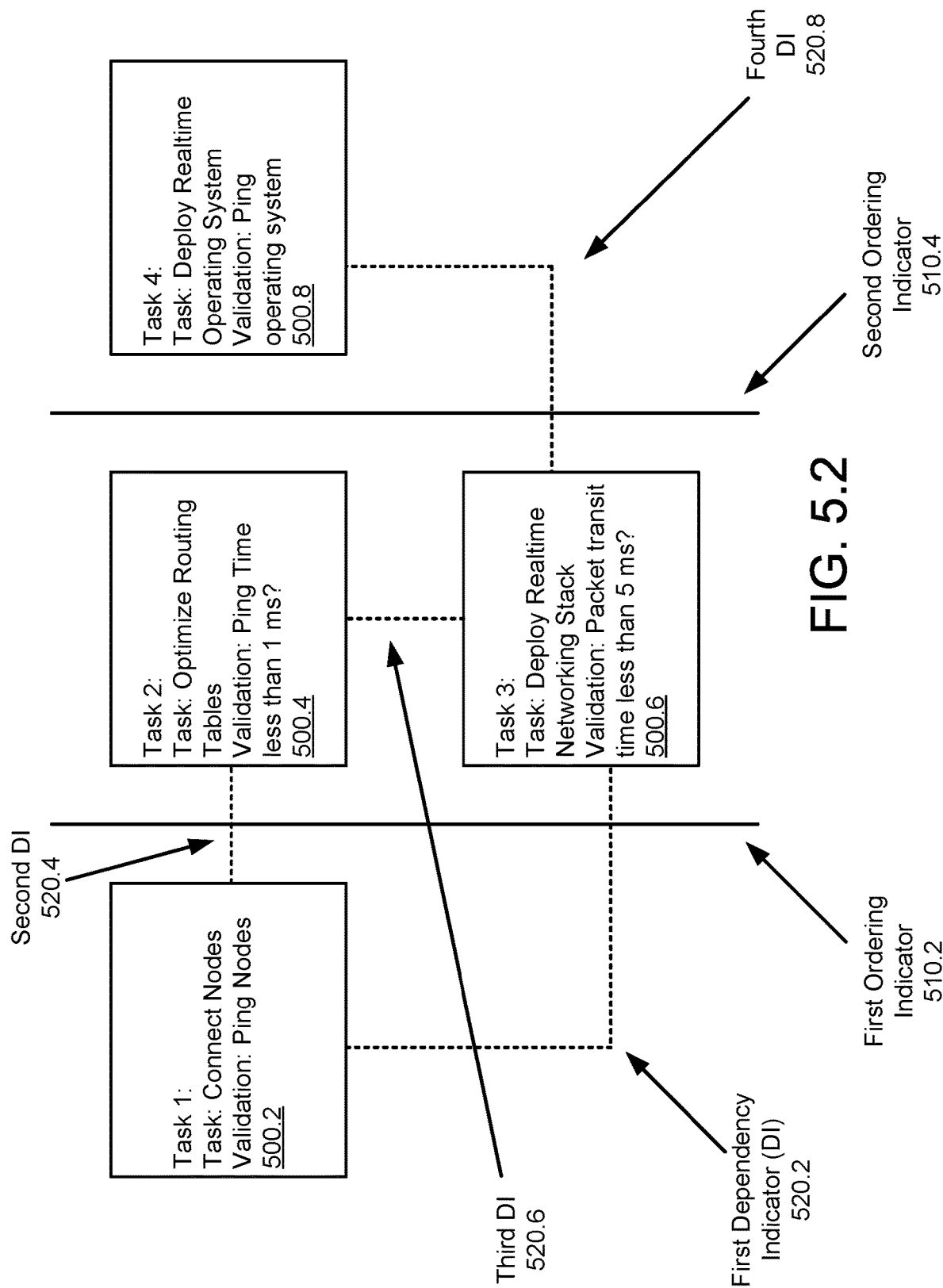
FIG. 5.2

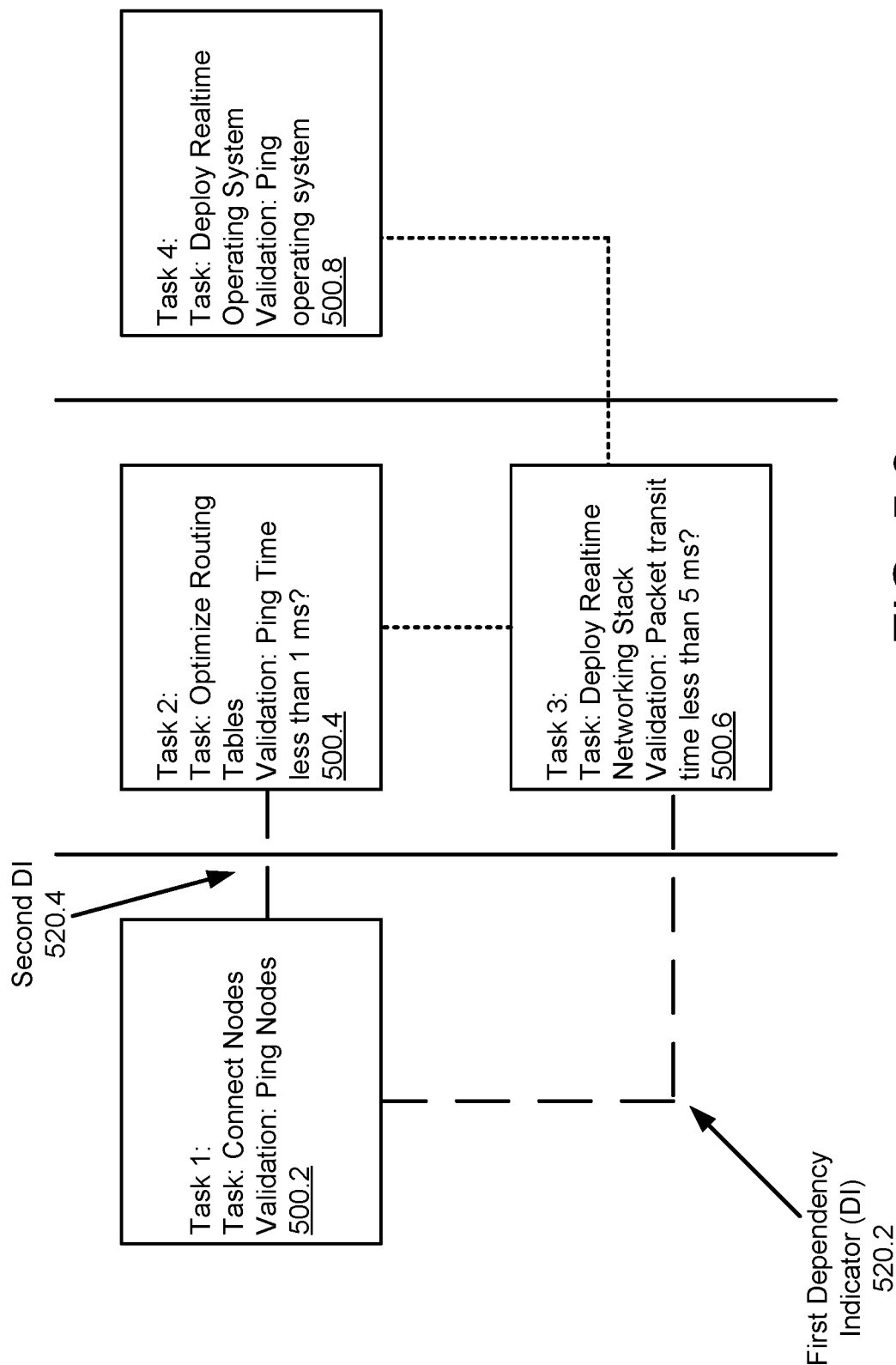
FIG. 5.3

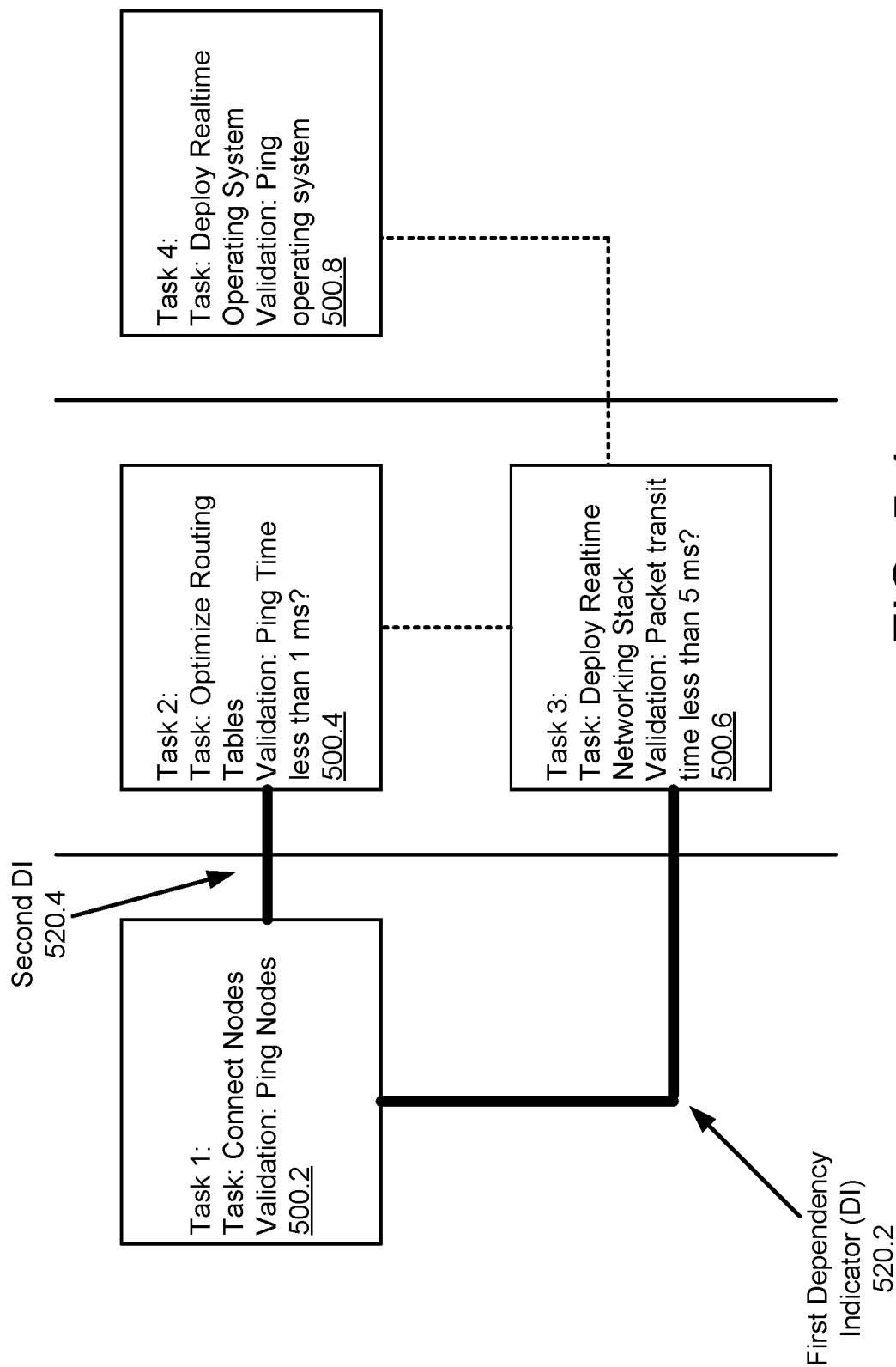
FIG. 5.4

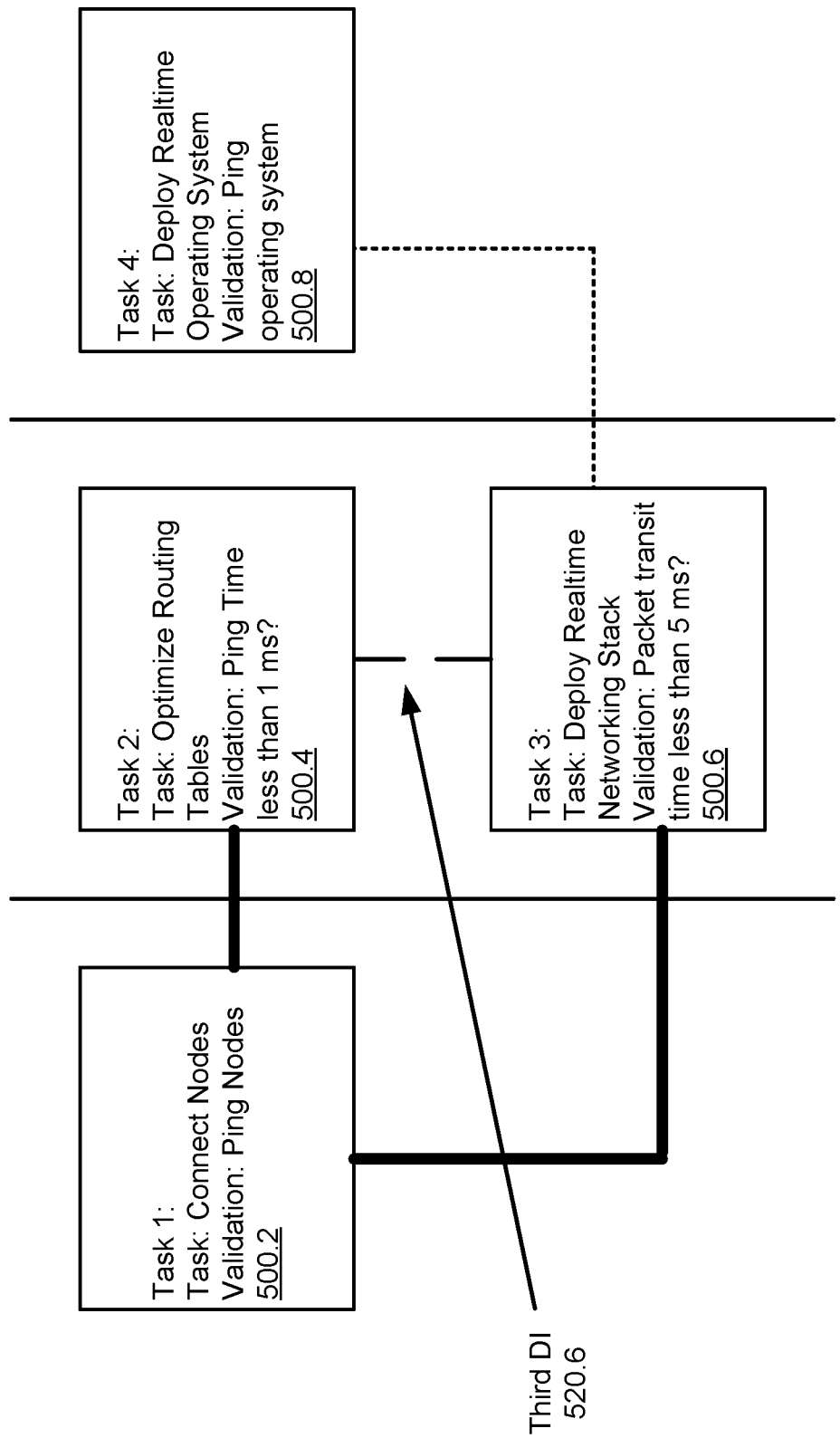
FIG. 5.5

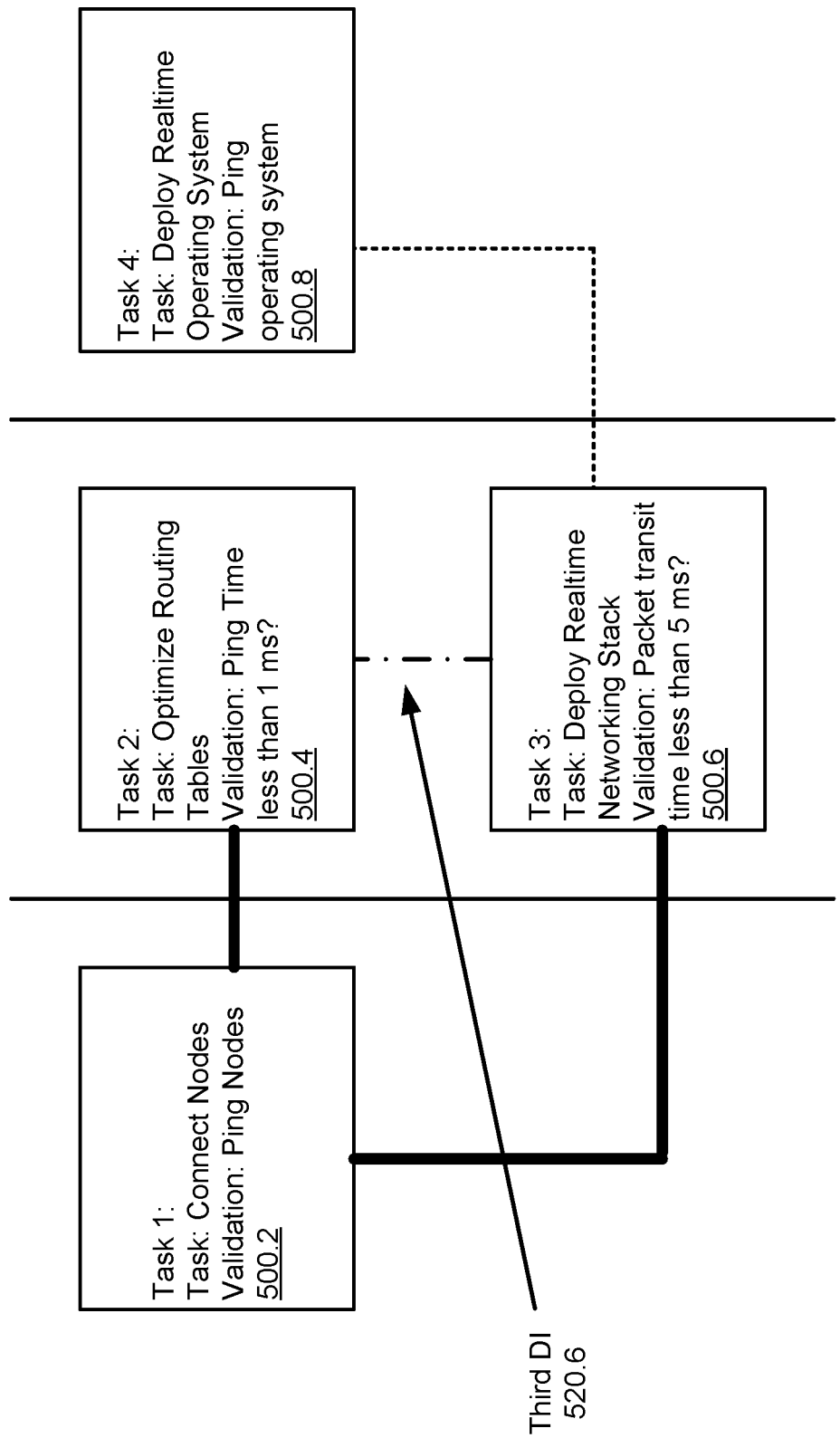
FIG. 5.6

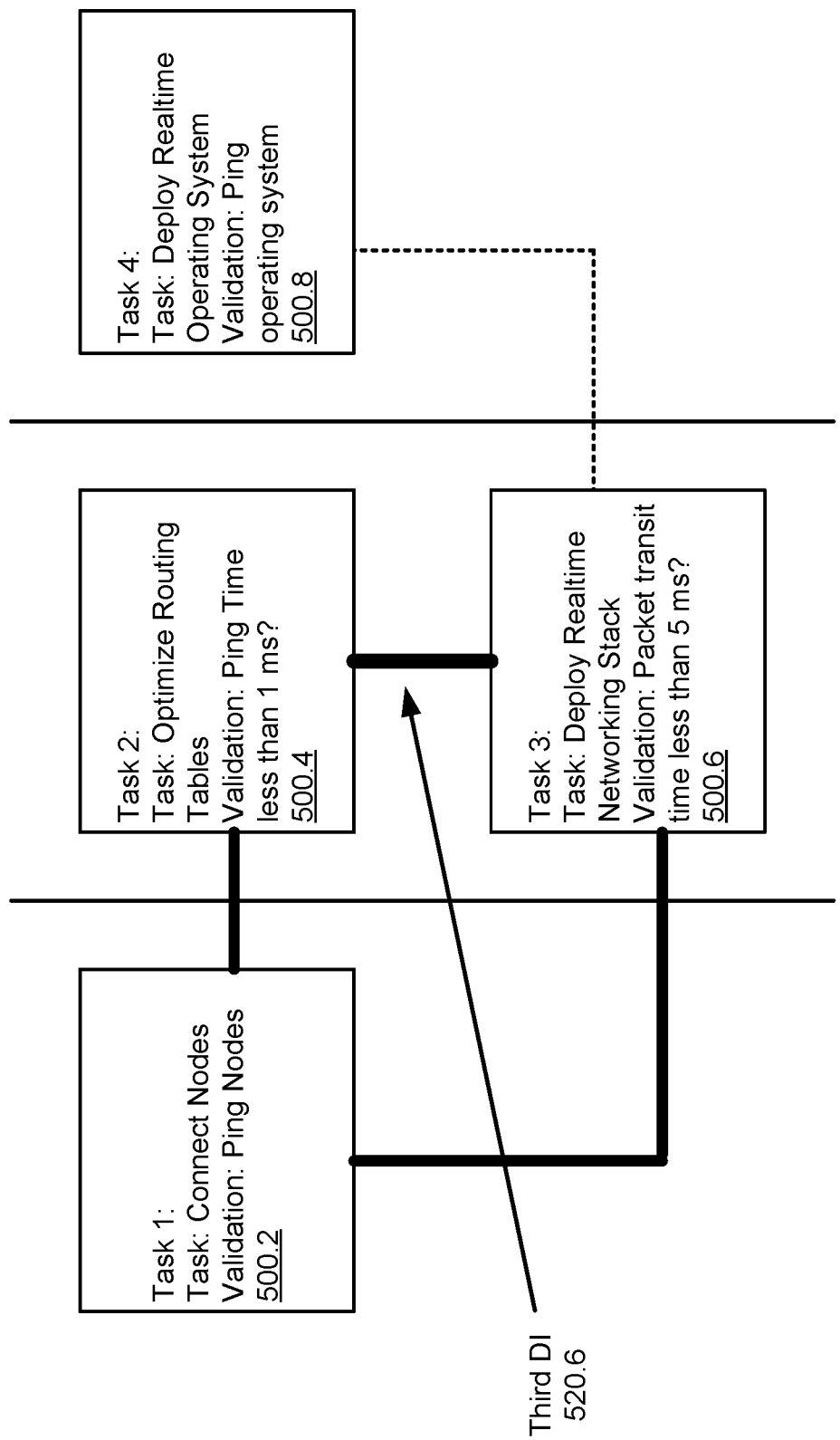
FIG. 5.7

SYSTEM AND METHOD TO ASSIGN, MONITOR, AND VALIDATE SOLUTION INFRASTRUCTURE DEPLOYMENT PREREQUISITES IN A CUSTOMER DATA CENTER

BACKGROUND

Computing devices may provide services to other computing devices. For example, a computing device hosting application such as a website server may provide services to other computing devices by serving webpages to the other computing devices. The computing devices may be connected by operable connections such as, for example, the Internet. The computing devices may host any number of applications. Each of applications may provide different types, or the same types, of services. Configuration of the devices is typically a manual error-prone process.

SUMMARY

In one aspect, a deployment orchestrator for managing deployment of a solution architecture in accordance with one or more embodiments of the invention includes persistent storage and a deployment manager. The persistent storage stores a deployment plan. The a deployment manager obtains the deployment plan; orchestrates display, to a user of a user device of the solution architecture, of a graphical user interface (GUI) based on the deployment plan; obtains a task completion indicator for a task specified by the deployment plan via the graphical user interface; updates, based on the task completion indicator, at least one selected from a group consisting of a task GUI element of the GUI that is associated with the task and a relationship indicator of the GUI that is associated with the task to obtain an updated GUI that indicates that the task is provisionally completed; after updating the GUI: performs an automated validation task associated with the task; and makes a determination, based on the automated validation task, that the task is completed; and updates the updated GUI, based on the determination, to obtain a second updated GUI that indicates that the task is validly completed.

In one aspect, a method for managing a deployment orchestrator for managing deployment of a solution architecture in accordance with one or more embodiments of the invention includes obtaining a deployment plan associated with the solution architecture; orchestrating display, to a user of a user device of the solution architecture, of a graphical user interface (GUI) based on the deployment plan; obtaining a task completion indicator for a task specified by the deployment plan via the graphical user interface; updating, based on the task completion indicator, at least one selected from a group consisting of a task GUI element of the GUI that is associated with the task and a relationship indicator of the GUI that is associated with the task to obtain an updated GUI that indicates that the task is provisionally completed; after updating the GUI: performing an automated validation task associated with the task; and making a determination, based on the automated validation task, that the task is completed; and updating the updated GUI, based on the determination, to obtain a second updated GUI that indicates that the task is validly completed.

In one aspect, a non-transitory computer readable medium in accordance with one or more embodiments of the invention includes computer readable program code, which when executed by a computer processor enables the computer processor to perform a method for managing a deployment orchestrator for managing deployment of a solution architecture. The method includes obtaining a deployment plan associated with the solution architecture; orchestrating display, to a user of a user device of the solution architecture, of a graphical user interface (GUI) based on the deployment plan; obtaining a task completion indicator for a task specified by the deployment plan via the graphical user interface; updating, based on the task completion indicator, at least one selected from a group consisting of a task GUI element of the GUI that is associated with the task and a relationship indicator of the GUI that is associated with the task to obtain an updated GUI that indicates that the task is provisionally completed; after updating the GUI: performing an automated validation task associated with the task; and making a determination, based on the automated validation task, that the task is completed; and updating the updated GUI, based on the determination, to obtain a second updated GUI that indicates that the task is validly completed.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a deployment orchestrator in accordance with one or more embodiments of the invention.

FIG. 2 shows a diagram of a deployment plan in accordance with one or more embodiments of the invention.

FIG. 4.1 shows a diagram of a flowchart of a method of orchestrating deployment of a solution architecture in accordance with one or more embodiments of the invention.

FIG. 4.2 shows a continuation of the diagram of FIG. 4.1.

FIG. 5.1 shows a diagram of an example of a deployment plan.

FIG. 5.2 shows a diagram of a graphical user interface based on the deployment plan of FIG. 5.1.

FIG. 5.3 shows a diagram of the graphical user interface of FIG. 5.2 after a first update.

FIG. 5.4 shows a diagram of the graphical user interface of FIG. 5.2 after a first update.

FIG. 5.5 shows a diagram of the graphical user interface of FIG. 5.2 after a first update.

FIG. 5.6 shows a diagram of the graphical user interface of FIG. 5.2 after a first update.

FIG. 5.7 shows a diagram of the graphical user interface of FIG. 5.2 after a first update.

DETAILED DESCRIPTION

Figure 3:
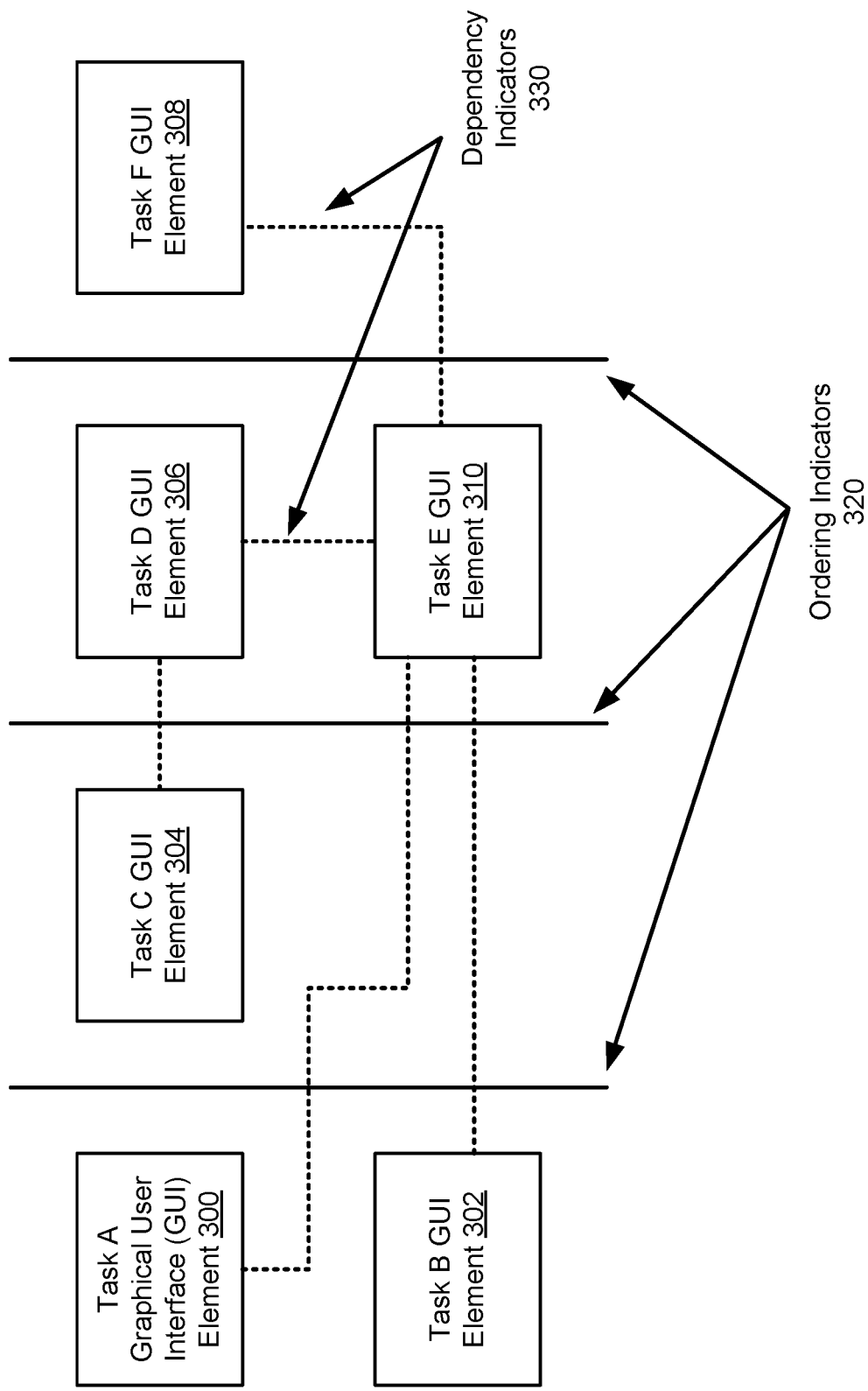
FIG. 3 shows a diagram of an example graphical user interface in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for deploying solution architectures. A solution architecture may be a distributed system. When components of the distributed system are configured in predetermined states, the distributed system may provide the functionality of the solution architecture.

In one or more embodiments of the invention, the system includes a deployment orchestrator that maintains a graphical user interface. The graphical user interface may provide entities with information used to configure the components of the distributed system.

In one or more embodiments of the invention, the deployment orchestrator automatically validates tasks performed by the entities in conjunction with deploying the solution architecture. The deployment orchestrator may, prior to performing the validation task, update the graphical user interface to indicate that the task has been provisionally completed. A provisional completion indication may indicate that the entity assigned the task is not to leave proximity of the solution architecture. After the validation task is performed and, if completed successfully, the deployment orchestrator may update the graphical interface to indicate that the task completion has been verified. A verified task completion indication may indicate that the entity assigned the task may leave proximity of the solution architecture. By doing so, embodiments of the invention may improve the efficiency of deploying a solution architecture.

FIG. 1.1 shows a diagram of an example system in accordance with one or more embodiments of the invention. The example system may facilitate configuration of a solution architecture (100). The solution architecture (100) may be a distributed computing system that provides predetermined functionality when components of the solution architecture (100) are configured. The solution architecture (100) may include any number of nodes (102.2, 102.4). To facilitate configuration of the solution architecture (100), the system may further include a deployment orchestrator (110). The deployment orchestrator (110) may organize any number of entities that are tasked with performing tasks for configuring the solution architecture (100). Each of the independent entities may have access to user devices (120). The user devices (120) may notify the entities of the status of configuring the solution architecture (100), any tasks assigned to each respective entity, and/or information usable by the entities for completing the tasks assigned to each respective entity. The system may include any number of user devices (122.2, 122.4).

Any of the components of FIG. 1.1 may be operably connected by any combination of wired and/or wireless networks. For example, the solution architecture (100) may be operably connected to the deployment orchestrator (110), the user devices (120), and/or other entities (not shown) by a network (not shown). While for the sake of brevity the system of FIG. 1.1 has been illustrated as including a limited number of components, embodiments of the invention may include additional components than those shown in FIG. 1.1 without departing from the invention. Each component of the system of FIG. 1.1 is described below.

The solution architecture (100) may provide services to other entities (not shown). For example, the solution architecture (100) may host any number of applications that provide computing services to other entities. The computing services may be, for example, database services, email services, instant messaging services, file storage services, and/or any other type of computer implemented services.

The other entities may be, for example, clients that rely on the services provided by the applications. Alternatively, the other entities may be, for example, other solution architectures.

The solution architecture (100) may include any number of nodes (102.2, 102.4). Each of the nodes may be a computing device. When all, or a portion, of the nodes (102.2, 102.4) are configured in predetermined states, the nodes (102.2, 102.4) may cooperatively provide the functionality of the solution architecture (100). Each node of the solution architecture (100) may perform similar or different function of the solution architecture (100). In other words, each of the nodes (102.2, 102.4) may be configured similarly to other nodes or differently from other nodes.

Configuring a node may include, but is not limited to: (i) modifying hardware settings, (ii) modifying firmware settings, (iii) modifying physical connectivity between the node and other computing devices, (iv) loading software onto the node, and/or (v) adding/removing/modifying other physical and/or logical components of the node.

Figure 6:
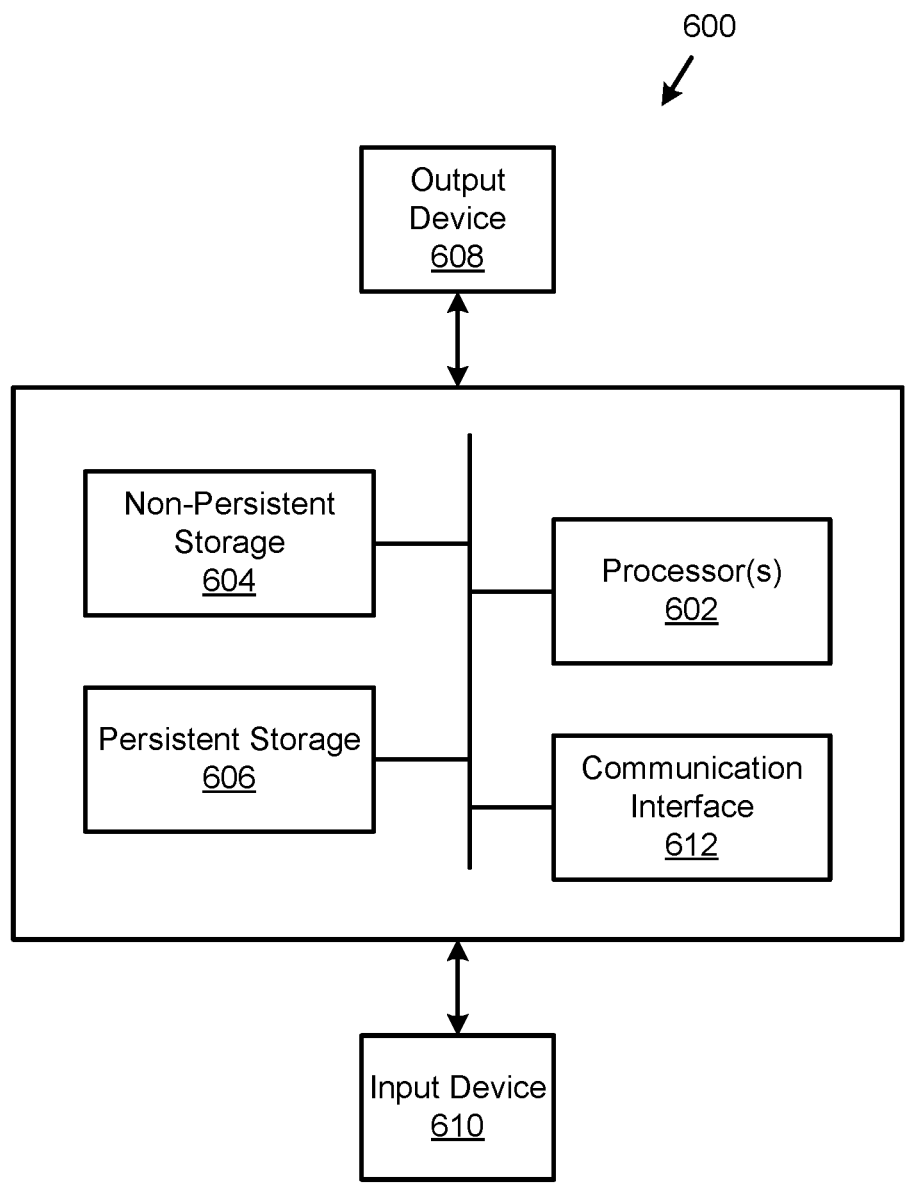
FIG. 6 shows a diagram of a computing device in accordance with one or more embodiments of the invention.

In one or more embodiments of the invention, each of the nodes (102.2, 102.4) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the nodes (102.2, 102.4) described in this application and/or all, or a portion, of the methods illustrated in FIGS. 4.1-4.2. The nodes (102.2, 102.4) may be other types of computing devices without departing from the invention.

While the nodes (102.2, 102.4) have been described as being physical devices, the nodes (102.2, 102.4) may be implemented as logical devices, e.g., virtual devices, which utilize computing resources of other physical computing devices without departing from the invention. For example, the nodes (102.2, 102.4) may be implemented as logical devices that utilize computing resources of computing devices or other entities operably connected to the node.

While the solution architecture (100) is illustrated as only including nodes (102.2, 102.4), the solution architecture (100) may include any number of devices without departing from the invention. For example, the solution architecture (100) may also include routers, switches, remote storage, and/or other hardware devices. When configuring the solution architecture (100), these devices (in addition to the nodes (102.2, 102.4)) may also be modified.

The deployment orchestrator (110) may provide configuration services. Providing configuration services may cause nodes of the solution architecture (100) to be configured into predetermined states. By configuring the nodes of the solution architecture (100), the solution architecture (100) may provide predetermined functionality and any number of clients and/or other entities.

In one or more embodiments of the invention, the deployment orchestrator (110) provides configuration services by orchestrating the generation of graphical user interfaces. Orchestrating generation of the graphical user interfaces may cause a graphical user interface to be generated for display to and/or interaction with a user. Orchestrating generation of the graphical user interfaces may be performed by generating the graphical user interfaces and sending them to other entities for display to users and/or by sending information to other entities used by the other entities to generate and display the graphical user interfaces to users. Orchestrating generation of the graphical user interfaces may be performed via other methods without departing from the invention.

The graphical user interfaces may be displayed on the user devices (120) to entities tasked with configuring the nodes of the solution architecture (100). The graphical user interfaces may include information usable by the entities to complete tasks assigned to the entities. Additionally, the graphical user interfaces may enable information regarding task completion to be obtained by the deployment orchestrator (110). The deployment orchestrator (110) may use the obtained information to orchestrate configuration of the solution architecture (100).

In one or more embodiments of the invention, the deployment orchestrator (110) dynamically generates graphical user interfaces based on the information regarding task completion. For example, based on the information, the deployment orchestrator (110) may automatically perform task validations on the solution architecture (100). The deployment orchestrator (110) may further modify the graphical user interfaces based on the outcome of the automatically performed task validations. In one or more embodiments of the invention, the automatically performed task validations are performed independently of any entity other than the deployment orchestrator (110). In other words, the user or other administrator may not act to perform the task validations. By performing the automatically performed task validations, the deployment orchestrator (110) may marshal limited resources including user time to more efficiently complete solution architecture (100) deployments when compared to contemporary methods of managing solution architecture (100) deployment. For example, the deployment orchestrator (110) may prevent entities from leaving the vicinity of the solution architecture (100) even when the entity indicates that all of their assigned tasks are completed. An entity may be, for example, a user, i.e., a person tasked with assisting in deployment of the solution architecture (100). For additional information regarding graphical user interfaces, refer to FIG. 3.

In one or more embodiments of the invention, the deployment orchestrator (110) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the deployment orchestrator (110) described in this application and/or all, or a portion, of the methods illustrated in FIGS. 4.1-4.2. The deployment orchestrator (110) may be other types of computing devices without departing from the invention.

While the deployment orchestrator (110) has been described as being a physical device, the deployment orchestrator (110) may be implemented as a logical device, e.g., virtual device, which utilize computing resources of other physical computing devices without departing from the invention. For example, the deployment orchestrator (110) may be implemented as logical device that utilizes computing resources of computing devices or other entities operably connected to the deployment orchestrator (110). For additional details regarding the deployment orchestrator (110), refer to FIG. 1.2.

The user devices (120) may provide configuration services in cooperation with the deployment orchestrator (110). For example, user devices (120) may generate graphical user interfaces based on information obtained from the deployment orchestrator (110). By doing so, entities assigned to perform tasks for configuring the solution architecture (100) may obtain information regarding the tasks, information regarding the state of configuring the solution architecture (100), and/or may provide information regarding: (i) status of a task, (ii) alleged completion of a task, and/or (iii) information regarding the solution architecture (100) and/or other relevant information. Such provided information may be provided to the deployment orchestrator (110).

In one or more embodiments of the invention, each of the user devices (122.2, 122.4) is a physical device. The physical device may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the user devices (122.2, 122.4) described in this application and/or all, or a portion, of the methods illustrated in FIGS. 4.1-4.2. The user devices (122.2, 122.4) may be other types of computing devices without departing from the invention.

While the user devices (122.2, 122.4) have been described as being physical devices, the user devices (122.2, 122.4) may be implemented as logical devices, e.g., virtual devices, which utilize computing resources of other physical computing devices without departing from the invention. For example, the user devices (122.2, 122.4) may be implemented as logical devices that utilize computing resources of computing devices or other entities operably connected to the node.

While the system of FIG. 1.1 has been illustrated as including a limited number of components, a system in accordance with one or more embodiments of the invention may include additional, fewer, and/or different components without departing from the invention. Additionally, while FIG. 1.1 as illustrated as only showing connections between some components of the system, a system in accordance with one or more embodiments of the invention may include any number of connections between any of the components illustrated in FIG. 1.1 and/or other components not illustrated in FIG. 1.1 without departing from the invention.

As noted above, the deployment orchestrator (110) may provide configuration services for the system of FIG. 1.1. To further clarify the deployment orchestrator (110), a diagram of the deployment orchestrator (110) in accordance with one or more embodiments of the invention is shown in FIG. 1.2.

To provide configuration services, the deployment orchestrator (110) may include a deployment manager (112) and a persistent storage (114). Each component of the deployment orchestrator (110) is discussed below.

The deployment manager (112) may orchestrate configuration of solution architectures. To orchestrate configuration of solution architectures, the deployment manager (112) may, but is not limited to: (i) orchestrate the generation of graphical user interfaces for display to entities that will perform tasks as part of configuring the solution architecture, (ii) obtain information regarding tasks performed by the entities, (iii) automatically validate whether the tasks have been completed, and/or (iv) take action to remediate any tasks that have allegedly been completed by entities but have not, in fact, been completed. By doing so, embodiments of the invention may more efficiently orchestrate configuration of solution architectures when compared to contemporary methods of configuring solution architectures that rely on self-reported task completion.

In one or more embodiments of the invention, the deployment manager (112) is a physical device. The physical device may include circuitry. The physical device may include a field programmable gate array, application specific integrated circuit, digital signal processor, microcontroller, and/or an embedded processor. The physical device may include persistent storage that stores computing instructions which when executed by the physical device cause the physical device to perform the functions of the deployment manager (112) described throughout this application and/or all or a portion of the methods illustrated in FIGS. 4.1-4.2.

In one or more embodiments of the invention, the deployment manager (112) is implemented as a logical entity. For example, the deployment manager (112) may be an application executing using hardware resources, e.g., processor cycles, memory capacity, storage capacity, communication bandwidth, etc., of the deployment orchestrator (110).

The persistent storage (114) may be a physical device for storing digital data. The persistent storage (114) may include any number of physical devices for storing digital data. The physical devices may be, for example, hard disk drives, solid state drives, tape drives, and any other type of physical device for persistent storage of data.

In one or more embodiments of the invention, the persistent storage (114) is a virtualized resource. For example, the persistent storage (114) may be a virtual drive. The virtual drive may use computing resources of any number of physical computing devices without departing from the invention.

In one or more embodiments of the invention, the persistent storage (114) stores data structures. For example, the persistent storage (114) may store, a deployment plan (114.2) and an entity information repository (114.4). Each of these data structures is discussed below.

The deployment plan (114.2) may be a data structure that includes information regarding tasks to be performed to configure a solution architecture. The employment plan (114.2) may include information regarding any number of tasks to be performed as part of the process of configuring a solution architecture. For additional details regarding the deployment plan (114.2), refer to FIG. 2.

The entity information repository (114.4) may be a data structure that includes information regarding entities that have been tasked with configuring the solution architecture. The entity information repository (114.4) specify a user device associated with each entity, identification information regarding the entity, and/or other information relevant for assigning tasks to entities, obtaining information from entities, and/or other purposes in connection with configuring a solution architecture.

While the deployment orchestrator (110) has been illustrated as including a limited number of components, the deployment orchestrator (110) may include additional, fewer, and/or different components without departing from the invention.

As discussed above, the deployment orchestrator (110) orchestrates configuration of a solution architecture, the deployment orchestrator (110) may perform the orchestration using the deployment plan (114.2). FIG. 2 shows a diagram of the deployment plan (114.2) in accordance with one or more embodiments of the invention.

The deployment plan (114.2) may include any number of tasks (200, 202). Each of the tasks may include information that specifies actions to be performed by an entity as part of configuring a solution architecture.

In one or more embodiments of the invention, a task (e.g., 200) includes an assignee identifier (200.2), a tasked description (200.4), an automated validation task (200.6), and task relationships (200.8). Tasks may include additional, less, and/or different information without departing from the invention.

An assignee identifier (200.2) may be information regarding an entity assigned to perform the task. For example, the assignee identifier (200.2) may be a unique identifier associated with the entity. The assignee identifier (200.2) may be other types of information without departing from the invention.

A task description (200.4) may be information regarding the task to be performed by the user. For example, the task description (200.4) may specify one or more actions to be completed by an entity. The actions may, if completed, partially configure the solution architecture.

For example, a task description (200.4) may be to connect port 1 of a node to a router that is connected to a second node of the solution architecture. If completed, this task would change the connectivity between nodes of a solution architecture.

The automatic validation task (200.6) may be information regarding a validation task to be completed after the task described by the task description (200.4) has been purported as being completed. If completed, the validation task may validate whether the task described by the tasked description (200.4) has actually been completed.

For example, validation task (200.4) may be to cause a first node to ping a second node of a solution architecture that has allegedly been connected together. By performing this validation task, the alleged change in connectivity purportedly completed when a report of completion of a corresponding task is received.

The task relationships (200.8) may be information regarding a relationship between the tasked is specified by the tasked description (200.4) and other tasks of the deployment plan (114.2). For example, the task relationships (200.8) may specify any number of other tasks that must be completed prior to when the may be performed. In another example, the task relationships (200.8) may specify any number of other tasks that must not be started prior to completion of the task.

While the deployment plan (114.2) has been illustrated as including specific information in a specific format, the deployment plan (114.2) may include additional, less, and/or different information without departing from the invention. Additionally, the deployment plan (114.2) may be divided into any number of separate data structures, combined with other data structure, and/or the information included in the deployment plan (114.2) may be stored in different organizational structures without departing from the invention.

As discussed above, the deployment orchestrator may orchestrate generation and display of graphical user interfaces when orchestrating configuration of a solution architecture. FIG. 3 shows a diagram of an example graphical user interface in accordance with one or more embodiments of the invention.

The example graphical user interface is based on a deployment plan including six tasks. The deployment plan indicates that task E depends on tasks A and B, that task D depends on task C, and that task F depends on task E.

The example graphical user interface includes six task graphical user interface elements (300, 302, 304, 306, 308, 310). Each of the task graphical user interface elements may be a display element for displaying information regarding each of the respective tasks of the deployment plan. For example, the task graphical user interface elements may be interactive text boxes that display text indicating a task to be completed by an entity. The text boxes may also each indicate a user that is assigned to complete the respective task. Each of the text boxes may also include a border that indicates a state of the task. For example, the border may have a color, thickness, or other characteristic that indicates whether the respective task has a state of: (i) to be completed, (ii) allegedly completed, (iii) reported as completed but not actually completed, and/or (iv) reported as completed and task completion verified.

Additionally, each of the task graphical user interface elements may be interactive. In other words, the user may interact with these task graphical user interface elements by a user interface device such as a mouse, touchscreen, and/or keyboard. When the task graphical user interface elements are interacted with while displayed, a widget (not shown) for receiving input may be displayed. For example, input box may be displayed that enables an entity to input data in the input box via a user interface device. Such information may be associated with the particular task graphical user interface element which was interacted with by the entity prompting the widget display. By doing so, an entity may provide information regarding a particular task. For example, the entity may send a report of allegedly completing a task via the provided information.

The example graphical user interface includes ordering indicators (320), illustrated as vertical solid lines, which indicate different groupings of task graphical user interface elements. The groupings may be based on an inherent logical ordering specified by the dependencies of the tasks of the deployment plan. For example, groups of tasks that are mutually dependent upon completion of another task may be demarcated from the task upon which the group of tasks depends. In FIG. 3, for example, task A graphical user interface element (300) and task B graphical user interface element (302) are demarcated from task E graphical user interface element (310) because task E depends on both task A and task B of the deployment plan. The ordering indicators (320) may have different thicknesses, coloring, or other visual indicators to indicate particular types of groupings. For example, a thick line used as an ordering indicator may indicate a task that is dependent upon a string of other tasks that each depends upon each other. In contrast, a thin line used as an ordering indicator may indicate that a task is dependent only upon a single other task.

The example graphical user interface includes dependency indicators (330), illustrated as dashed lines, that indicate dependencies between different tasks. The dependency indicators (330) may be any number of line segments between two task graphical user interface elements. The line segments may have line thicknesses, coloring, or other graphical indicators to specify a state of the dependency as: (i) no report of dependent task completion, (ii) dependent task reported as completed, (iii) report of task completed but not actually completed, and (iv) report of task completed and completion verified.

The example graphical user interface of FIG. 3 may be rendered and displayed to a user via a user device using any method without departing from the invention. In one or more embodiments of the invention, the example graphical user interface is generated by a deployment orchestrator, sent to a user device, and displayed to an entity via user device. In one or more embodiments of the invention, the example graphical user interface is generated by a user device based on information provided by a deployment orchestrator. The user device may display the graphical user interface to an entity. Additionally, information obtained via the graphical user interface may be provided to the deployment orchestrator and/or other entities via any method without departing from the invention.

As discussed above, a deployment orchestrator may orchestrate deployment of a solution architecture. FIGS. 4.1-4.2 show a method in accordance with one or more embodiments of the invention that may be performed by components of the system of FIG. 1.1. While illustrated as a series of steps, any of the steps shown in FIGS. 4.1-4.2 may be omitted, performed in a different order, and/or performed in a parallel or partially overlapping manner. Further, additional steps, other than those shown in FIGS. 4.1-4.2 may be performed as part of the methods discussed below without departing from the invention.

FIG. 4.1 shows a flowchart of a method in accordance with one or more embodiments of the invention. The method depicted in FIG. 4.1 may be used to orchestrate deployment of a solution architecture in accordance with one or more embodiments of the invention. The method shown in FIG. 4.1 may be performed by, for example, a deployment orchestrator (e.g., 110, FIG. 1.2). Other components of the system illustrated in FIG. 1.1 may perform the method of FIG. 4.1 without departing from the invention.

In step 400, a deployment plan is obtained.

In one or more embodiments of the invention, the deployment plan specifies any number of tasks to be completed by entities as part of deploying a solution architecture.

In one or more embodiments of the invention, the deployment plan is obtained from persistent storage of the deployment orchestrator. The deployment plan may have been stored on a persistent storage prior to the method illustrated in FIG. 4.1. The deployment plan may have been generated by administrator responsible for deploying the solution architecture.

In step 402, a graphical user interface for an entity is generated based on the deployment plan.

In one or more embodiments of the invention, the graphical user interface is generated by parsing the deployment plan into logical groupings of tasks based on dependencies between the tasks. For each logical grouping, portion of the graphical user interface may be reserved. In each of the reserved portions of the graphical user interface, task graphical user interface elements may be instantiated that correspond to the tasks in each logical grouping.

In one or more embodiments of the invention, the graphical user interface is generated by instantiating ordering indicators between each of the reserved portions of the graphical user interface. The visual appearance of each ordering indicator may correspond to a relationship between the logical groupings demarcated by the respective ordering indicators. The ordering indicators may be lines demarcating logical groupings.

In one or more embodiments of the invention, the graphical user interface is generated by instantiating dependency indicators between task graphical user interface elements of different logical groupings. The dependency indicators may be lines connecting different task graphical user interface elements of different logical groupings. The dependency indicators may cross over one or more ordering indicators. The dependency indicators may have visual appearance corresponding to the state of a task upon which a second task depends.

In one or more embodiments of the invention, the graphical user interface is generated by the deployment orchestrator. The deployment orchestrator may cause the generated graphical user interface to be displayed to the entity via the user interface. For example, the deployment orchestrator may send the generated graphical user interface to the user device associated with the entity. The deployment orchestrator may identify the user device via information included in an entity information repository.

In one or more embodiments of the invention, the graphical user interface is generated by a user device. The user device may generate the graphical user interface based on information obtained from a deployment orchestrator. For example, the deployment orchestrator may send information regarding the deployment plan to the user device. User device may generate graphical user interface based on information regarding the deployment plan.

In step 404, a task completion indicator is obtained via the graphical user interface.

In one or more embodiments of the invention, the task completion indicator specifies that a task of the deployment plan has allegedly been completed. The task completion indicator may be obtained from an entity via the graphical user interface.

For example, an entity may interact with a task graphical user interface element of the graphical user interface, provide information indicating completion of the task via the interaction, and the graphical user interface may store such information. The information may be provided to the deployment orchestrator.

In step 406, at least one of (i) a task graphical user interface element and (ii) a relationship indicator is updated based on the task completion indicator.

In one or more embodiments of the invention, updating the at least one of (i) a task graphical user interface element and (ii) a relationship indicator changes an appearance of the respective portion of the graphical user interface. For example, a color of the respective portion may change to indicate that an entity has reported completion of the task.

For a task graphical user interface element, the color or other visual appearance of a border may change. For a relationship indicator, the color or other visual appearance of the line may change. The change may indicate that a report of completion of the task has been obtained.

The appearance of the task graphical user interface element and/or a relationship indicator may indicate that an entity assigned the task is not authorized to leave proximity to the solution architecture. By doing so, an entity may be prevented from leaving proximity to the solution architecture before validation of task completion is completed.

Updating the task graphical user interface element and/or a relationship indicator as set forth in step 406 may indicate a provisional completion of a task.

In step 408, an automated validation task associated with a task associated with the task completion indicator is performed to determine whether the task is complete.

In one or more embodiments of the invention, the automated validation task is specified by the deployment plan.

In one or more embodiments of the invention, the automated validation task is performed by nodes of the solution architecture. For example, the deployment orchestrator may send instructions to the nodes to perform a particular set of actions specified by the automated validation task. Based on the outcome of performing the tasks, it may be able to be determined whether the task associated with the automated validation task has been completed correctly.

For example, the automated validation task may be to check network conductivity of a node of the solution architecture. In another example, the automated validation task may be to check the hardware components of a node of the solution architecture. In a still further example, automated validation task may be to attempt to utilize services to be provided by a node of a solution architecture. The automated validation task may be other types of tasks without departing from the invention.

In one or more embodiments of the invention, the automated validation task is performed by another entity other than the entity that performed the task associated with automated validation task.

In one or more embodiments of the invention, the automated validation task is not performed by a user or other entity. The automated validation task may be entirely computer implemented.

The method may continue to step 410 in FIG. 4.2 following step 408.

FIG. 4.2 shows a diagram of a continuation of the flowchart illustrated in FIG. 4.1.

In step 410, a determination is made regarding whether the task is complete.

In one or more embodiments of the invention, the determination is made based on the outcome of the automated validation task.

If the task is complete, method may proceed to step 414. If the task is not complete, the method may proceed to step 412.

In step 412, the task is remediated.

In one or more embodiments of the invention, the task is remediated by performing steps 404-408. In other words, the task is remediated by having an entity assigned to perform the task attempt to perform the task and send an additional indicator that the task is completed. Completion may then be validated via steps 406-410.

In one or more embodiments of the invention, the task is remediated by updating the appearance of a task graphical user interface element and/or a relationship indicator. For example, the appearance may be changed to indicate to entities that the task has not been properly completed. The color of the task graphical user interface element and/or a relationship indicator may be changed to a red color to indicate that the task has not yet been completed.

The method may proceed to Step 410 following step 412.

As noted above, the method may proceed to Step 414 following step 410. In Step 414, at least one of (i) the task graphical user interface element and (ii) the relationship indicator is updated to indicate that the task is completed.

In one or more embodiments of the invention, the task graphical user interface element and/or a relationship indicator appearance is indicated by changing its color to indicate task completion. For example, the color of the task graphical user interface element and/or a relationship indicator (or other visual indicator) may be changed to blue to indicate that the task is completed. The color (or other visual indicator such as text) may indicate that the entity assigned the task is authorized to leave proximity to the solution architecture.

Updating the task graphical user interface element and/or a relationship indicator as set forth in step 414 may indicate that the task completion has been verified.

The method may end following Step 414.

To further clarify aspects of embodiments of the invention, a non-limiting example is provided in FIGS. 5.1-5.7. In FIGS. 5.1-5.7, a system similar to the system of FIG. 1.1 is performing a configuration of a solution architecture. For the sake of brevity, only a limited amount of information regarding the system is shown in FIGS. 5.1-5.7. Specifically, in FIGS. 5.3-5.7 some of the reference indicators that were present in FIG. 5.2 are not included to simplify the figures.

Example

FIG. 5.1 shows a diagram of a deployment plan used by a deployment orchestrator. As seen, the deployment plan includes four tasks. To enable entities to perform their assigned tasks, the deployment orchestrator causes a graphical user interface as shown in FIG. 5.2 to be generated based on the deployment plan of FIG. 5.1.

As seen in FIG. 5.2, the graphical user interface includes four task graphical user interface elements (500.2, 500.4, 500.6, 500.8) demarcated into logical groupings by two ordering indicators (510.2, 510.4). Additionally, the graphical user interface includes four dependency indicators (520.2, 520.4, 520.6, 520.8) indicating dependencies between the four task graphical user interface elements (500.2, 500.4, 500.6, 500.8).

For clarity, the element labels for the ordering indicators (510.2, 510.4) and dependency indicators (520.2, 520.4, 520.6, 520.8) are not shown in FIGS. 5.2-5.3.

After generating the graphical user interface of FIG. 5.2, an entity reports that task 1 is completed by interacting with the first task graphical user interface element (500.2). In response to the report, the deployment orchestrator changes a visual appearance of the first and second dependency indicators (520.2, 520.4) to long dashing to indicate the alleged completion as shown in FIG. 5.3. Additionally, the deployment orchestrator performs a task validation action for the task by pinging the nodes as specified by task 1. The validation action completes successfully.

In response to the successful completion of the task validation action, the deployment orchestrator modifies the appearance of the first and second dependency indicators (520.2, 520.4) to a thick, solid black line as indicated in FIG. 5.4.

After the modified appearance of the first and second dependency indicators (520.2, 520.4), a second entity performs task two because all of its prerequisites are met, i.e., completion of task 1, and sends a second task completion indicator to the deployment orchestrator via the graphical user interface by interacting with the second task graphical user interface element (500.4).

In response to the report, the deployment orchestrator changes a visual appearance of the third dependency indicator (520.6) to long dashing to indicate the alleged completion as shown in FIG. 5.5. Additionally, the deployment orchestrator performs a task validation action for the task by checking whether the ping time of the nodes is less than 1 millisecond specified by task 2. The validation action does not complete successfully.

In response to the failed completion of the task validation action, the deployment orchestrator modifies the appearance of the third dependency indicator (520.6) to a dashed, dotted line as indicated in FIG. 5.6 to indicate to entities unsuccessful completion of the task.

In response to the appearance of the third dependency indicator (520.6), the second entity performs task 2 again and sends a third task completion indicator to the deployment orchestrator via the graphical user interface by interacting with the second task graphical user interface element (500.4) again.

In response to receiving the third task completion indicator, the deployment orchestrator performs the task validation action for the task by pinging the nodes as specified by task 1. The validation action completes successfully.

In response to the successful completion of the task validation action, the deployment orchestrator modifies the appearance of the third dependency indicator (520.6) to a thick, solid black line as indicated in FIG. 5.7.

Following the update to the graphical user interface in FIG. 5.7, the deployment orchestrator repeats the process until the solution architecture is successfully deployed and all entities have received indications that they are authorized to leave proximity to the solution architecture.

End of Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device. The communication interface (612) may include a network adapter or other hardware element that supports communications via any type of networking technology/standard.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may improve the field of distributed system technology. Specifically, embodiments of the invention may improve the process for deploying a distributed system. For example, due to the complexity of distributed systems, it is common to require multiple subject matter experts to cooperatively work to complete deployment of a distribute system, i.e., a solution architecture. If a subject matter expert believes that their assigned tasks are complete and leaves the proximity of a distributed solution, the subject matter expert may have to return to proximity to the distributed solution if their assigned tasks were not, in fact, complete.

Embodiments of the invention may reduce the likelihood of subject matter experts leaving a distributed system before actual completion of assigned tasks. Specifically, embodiments of the invention may provide an automated validation of task completions of a distributed system, rather than relying on self-reported completion. By doing so, embodiments of the invention may reduce the completion time of deployment of solution architecture.

Thus, embodiments of the invention may address a technological problem, e.g., dependence of multiple steps of deployments of a distributed system. Embodiments of the invention may improve such system by incorporating automated validation checks into deployment workflows.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of a configurable device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A deployment orchestrator for managing deployment of a solution architecture that provides services to other entities, comprising:
persistent storage for storing a deployment plan comprising tasks to be performed to configure the solution architecture to provide the services; and
a deployment manager programmed to:
obtain the deployment plan;
orchestrate display, to a user of a user device of the solution architecture, of a graphical user interface (GUI) based on the deployment plan;
obtain a task completion indicator for a task specified by the deployment plan via the graphical user interface;
update, based on the task completion indicator and to obtain an updated GUI that indicates that the task is provisionally completed, at least one selected from a group consisting of a task GUI element of the GUI that is associated with the task and a relationship indicator of the GUI that is associated with the task;
after updating the GUI:
perform an automated validation task associated with the task; and
make a determination, based on the automated validation task, that the task is completed; and
update the updated GUI, based on the determination, to obtain a second updated GUI that indicates that the task is validly completed.

2. The deployment orchestrator of claim 1, wherein the deployment manager is further programmed to:
obtain a second task completion indicator for a second task specified by the deployment plan via the graphical user interface;
update, based on the second task completion indicator, at least one selected from a group consisting of a second task GUI element of the second updated GUI that is associated with the second task and a second relationship indicator of the second updated GUI that is associated with the second task to obtain a third updated GUI that indicates that the second task is provisionally completed;
after updating the GUI:
perform a second automated validation task associated with the second task; and
make a second determination, based on the second automated validation task, that the second task is not completed;
in response to the second determination:
update the third updated GUI, based on the second determination, to obtain a fourth updated GUI that indicates that the task is not validly completed; and
remediate the second task.

3. The deployment orchestrator of claim 2, wherein the fourth updated GUI indicates that a user tasked with the second task is not authorized to leave a vicinity of the solution architecture.

4. The deployment orchestrator of claim 2, wherein the second updated GUI indicates that a second user tasked with the task is authorized to leave the vicinity of the solution architecture.

5. The deployment orchestrator of claim 1, wherein the validation task comprises pinging a node of the solution architecture, wherein the node is associated with the task.

6. The deployment orchestrator of claim 1, wherein the validation task comprises mapping a connectivity of a node of the solution architecture with a second node of the solution architecture, wherein the node and the second node are both associated with the task.

7. The deployment orchestrator of claim 1, wherein the GUI comprises:
the task GUI element that is associated with the task of the deployment plan;

a second task GUI element that is associated with a second task of the deployment plan, wherein the second task depends on completion of the task;
an ordering indicator demarcating the task GUI element from the second task GUI element; and
a dependency indicator linking the second task GUI element and the task GUI element.

8. A method for managing a deployment orchestrator for managing deployment of a solution architecture that provides services to other entities, comprising:
obtaining a deployment plan associated with the solution architecture, wherein the deployment plan comprises tasks to be performed to configure the solution architecture to provide the services;
orchestrating display, to a user of a user device of the solution architecture, of a graphical user interface (GUI) based on the deployment plan;
obtaining a task completion indicator for a task specified by the deployment plan via the graphical user interface;
updating, based on the task completion indicator and to obtain an updated GUI that indicates that the task is provisionally completed, at least one selected from a group consisting of a task GUI element of the GUI that is associated with the task and a relationship indicator of the GUI that is associated with the task;
after updating the GUI:
performing an automated validation task associated with the task; and
making a determination, based on the automated validation task, that the task is completed; and
updating the updated GUI, based on the determination, to obtain a second updated GUI that indicates that the task is validly completed.

9. The method of claim 8, further comprising:
obtaining a second task completion indicator for a second task specified by the deployment plan via the graphical user interface;
updating, based on the second task completion indicator, at least one selected from a group consisting of a second task GUI element of the second updated GUI that is associated with the second task and a second relationship indicator of the second updated GUI that is associated with the second task to obtain a third updated GUI that indicates that the second task is provisionally completed;
after updating the GUI:
performing a second automated validation task associated with the second task; and
making a second determination, based on the second automated validation task, that the second task is not completed;
in response to the second determination:
updating the third updated GUI, based on the second determination, to obtain a fourth updated GUI that indicates that the task is not validly completed; and
remediating the second task.

10. The method of claim 9, wherein the fourth updated GUI indicates that a user tasked with the second task is not authorized to leave a vicinity of the solution architecture.

11. The method of claim 9, wherein the second updated GUI indicates that a second user tasked with the task is authorized to leave the vicinity of the solution architecture.

12. The method of claim 8, wherein the validation task comprises pinging a node of the solution architecture, wherein the node is associated with the task.

13. The method of claim 8, wherein the validation task comprises mapping a connectivity of a node of the solution architecture with a second node of the solution architecture, wherein the node and the second node are both associated with the task.

14. The method of claim 8, wherein the GUI comprises:
the task GUI element that is associated with the task of the deployment plan;
a second task GUI element that is associated with a second task of the deployment plan, wherein the second task depends on completion of the task;
an ordering indicator demarcating the task GUI element from the second task GUI element; and
a dependency indicator linking the second task GUI element and the task GUI element.

15. A non-transitory computer readable medium comprising computer readable program code, which when executed by a computer processor enables the computer processor to perform a method for managing a deployment orchestrator for managing deployment of a solution architecture that provides services to other entities, the method comprising:
obtaining a deployment plan associated with the solution architecture, wherein the deployment plan comprises to be performed to configure the solution architecture to provide the services;
orchestrating display, to a user of a user device of the solution architecture, of a graphical user interface (GUI) based on the deployment plan;
obtaining a task completion indicator for a task specified by the deployment plan via the graphical user interface;
updating, based on the task completion indicator and to obtain an updated GUI that indicates that the task is provisionally completed, at least one selected from a group consisting of a task GUI element of the GUI that is associated with the task and a relationship indicator of the GUI that is associated with the task;
after updating the GUI:
performing an automated validation task associated with the task; and
making a determination, based on the automated validation task, that the task is completed; and
updating the updated GUI, based on the determination, to obtain a second updated GUI that indicates that the task is validly completed.

16. The non-transitory computer readable medium of claim 15, wherein the method further comprises:
obtaining a second task completion indicator for a second task specified by the deployment plan via the graphical user interface;
updating, based on the second task completion indicator, at least one selected from a group consisting of a second task GUI element of the second updated GUI that is associated with the second task and a second relationship indicator of the second updated GUI that is associated with the second task to obtain a third updated GUI that indicates that the second task is provisionally completed;
after updating the GUI:
performing a second automated validation task associated with the second task; and
making a second determination, based on the second automated validation task, that the second task is not completed;
in response to the second determination:

updating the third updated GUI, based on the second determination, to obtain a fourth updated GUI that indicates that the task is not validly completed; and remediating the second task.

17. The non-transitory computer readable medium of claim 16, wherein the fourth updated GUI indicates that a user tasked with the second task is not authorized to leave a vicinity of the solution architecture.

18. The non-transitory computer readable medium of claim 16, wherein the second updated GUI indicates that a second user tasked with the task is authorized to leave the vicinity of the solution architecture.

19. The non-transitory computer readable medium of claim 15, wherein the validation task comprises pinging a node of the solution architecture, wherein the node is associated with the task.

20. The non-transitory computer readable medium of claim 15, wherein the validation task comprises mapping a connectivity of a node of the solution architecture with a second node of the solution architecture, wherein the node and the second node are both associated with the task.

* * * * *